US010294950B2

(12) United States Patent
Beifus et al.

(10) Patent No.: US 10,294,950 B2
(45) Date of Patent: May 21, 2019

(54) MOTOR CONTROLLER FOR ELECTRIC BLOWER MOTORS

(71) Applicant: Regal Beloit America, Inc., Beloit, WI (US)

(72) Inventors: Brian Lee Beifus, Fort Wayne, IN (US); Kathryn Bloomfield, Fort Wayne, IN (US); Andrew C. Barry, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 15/595,420

(22) Filed: May 15, 2017

(65) Prior Publication Data

US 2018/0328370 A1 Nov. 15, 2018

(51) Int. Cl.

| | |
|---|---|
| ***H02P 6/08*** | (2016.01) |
| ***F04D 27/00*** | (2006.01) |
| ***F24F 11/77*** | (2018.01) |
| *F24F 11/30* | (2018.01) |
| *F24F 11/62* | (2018.01) |

(52) U.S. Cl.

CPC ......... *F04D 27/004* (2013.01); *F04D 27/001* (2013.01); *F24F 11/77* (2018.01); *F24F 11/30* (2018.01); *F24F 11/62* (2018.01); *H02P 6/08* (2013.01)

(58) Field of Classification Search

CPC .......... F24F 11/30; F24F 3/044; F24F 3/0442; G05B 15/02; G05D 7/0676

USPC .......................................... 318/461, 432, 434

See application file for complete search history.

(56) References Cited

U.S. PATENT DOCUMENTS

| | | | | |
|---|---|---|---|---|
| 5,736,823 | A | 4/1998 | Nordby et al. | |
| 2008/0004754 | A1* | 1/2008 | Pouchak | F24F 3/0442 700/276 |
| 2009/0097988 | A1* | 4/2009 | Shizuo | F04D 27/004 417/45 |
| 2010/0256821 | A1* | 10/2010 | Jeung | G05B 15/02 700/276 |
| 2011/0264274 | A1* | 10/2011 | Grabinger | F24F 11/0001 700/276 |
| 2011/0264280 | A1* | 10/2011 | Grabinger | F24F 3/044 700/282 |
| 2012/0323377 | A1* | 12/2012 | Hoglund | F24F 11/30 700/277 |
| 2013/0345995 | A1 | 12/2013 | Shah et al. | |
| 2014/0371918 | A1* | 12/2014 | Douglas | G05D 7/0676 700/276 |
| 2015/0211760 | A1 | 7/2015 | Wang et al. | |
| 2016/0281723 | A1 | 9/2016 | Zhang et al. | |

* cited by examiner

*Primary Examiner* — Rina I Duda
(74) *Attorney, Agent, or Firm* — Armstrong Teasdale LLP

(57) ABSTRACT

A motor controller for an electric motor is provided. The electric motor is configured to drive a blower to generate an airflow. The motor controller includes a memory and a processor coupled thereto. The memory is configured to store a speed-to-airflow ratio associated with an airflow restriction on the blower. The processor is configured to receive a command for a calibrating airflow and operate the electric motor in a constant airflow mode to generate the calibrating airflow at a calibrating speed. The processor is further configured to write the calibrating speed and the calibrating airflow to the memory as the speed-to-airflow ratio.

18 Claims, 5 Drawing Sheets

MOTOR CONTROLLER FOR ELECTRIC BLOWER MOTORS

BACKGROUND

The field of the disclosure relates generally to a motor controller for an electric motor and, more specifically, a motor controller that enables accurate airflow at low airflow output levels.

Electric motors are typically torque-calibrated when manufactured to ensure the torque output at the drive shaft of the electric motor matches the torque commanded. At least some electric motors, particularly electric motors driving blowers, are further calibrated to produce a constant airflow during operation in either a torque-control mode or a speed-control mode. Such a calibration quantizes airflow output for a given speed and torque output when driving the blower. The actual airflow output can vary according to the blower construction, duct or other airflow restriction into which the airflow is directed. Further, estimating airflow output for a given speed and torque is subject to numerous sources of error, including, for example, parasitic current and noise in current sensing and current regulation circuits, magnetic flux changes with temperature, effects of magnetic flux on average current during peak current regulation, variability in bearing friction, variation and drift in calibration procedures and equipment, and imperfections in drive torque production linearity.

While estimations of airflow output remain accurate when operating over certain portions of the speed-torque operating profile, i.e., the calibration region where the above-mentioned sources of error are minimized, airflow output estimations generally exhibit greater error as airflow demand tends away from the calibration region. In particular, estimations of airflow output may exhibit significant error, e.g., up to plus-or-minus 10%, at low airflow output levels, e.g., at or below approximately 10% torque output. Generally, error increases as airflow tends toward zero. Operation of blowers at low airflow output levels is increasingly important to achieve efficiency targets.

BRIEF DESCRIPTION

In one aspect, a motor controller for an electric motor is provided. The electric motor is configured to drive a blower to generate an airflow. The motor controller includes a memory and a processor coupled thereto. The memory is configured to store a speed-to-airflow ratio associated with an airflow restriction on the blower. The processor is configured to receive a command for a calibrating airflow and operate the electric motor in a constant airflow mode to generate the calibrating airflow at a calibrating speed. The processor is further configured to write the calibrating speed and the calibrating airflow to the memory as the speed-to-airflow ratio.

In another aspect, a method of operating an electric motor is provided. The electric motor is configured to drive a blower to generate an airflow. The method includes operating the electric motor at a calibrating speed to drive the blower to generate a calibrating airflow, storing the calibrating speed and the calibrating airflow in a memory as a speed-to-airflow ratio, receiving a command for an objective airflow that is less than the calibrating airflow, computing an objective speed based on the calibrating airflow, the calibrating speed, and the objective airflow, and operating the electric motor at the objective speed to drive the blower to generate an output airflow.

In yet another aspect, a blower system is provided. The blower system includes a blower that generates an airflow directed into a duct having an airflow restriction, an electric motor coupled to the blower and that drives the blower, and a motor controller coupled to the electric motor. The motor controller determines a calibrating speed at which the electric motor turns to drive the blower to generate a calibrating airflow, computes an objective speed based on the calibrating airflow, the calibrating speed, and a commanded objective airflow, and operates the electric motor at the objective speed to generate an output airflow.

DETAILED DESCRIPTION

Figure 1:
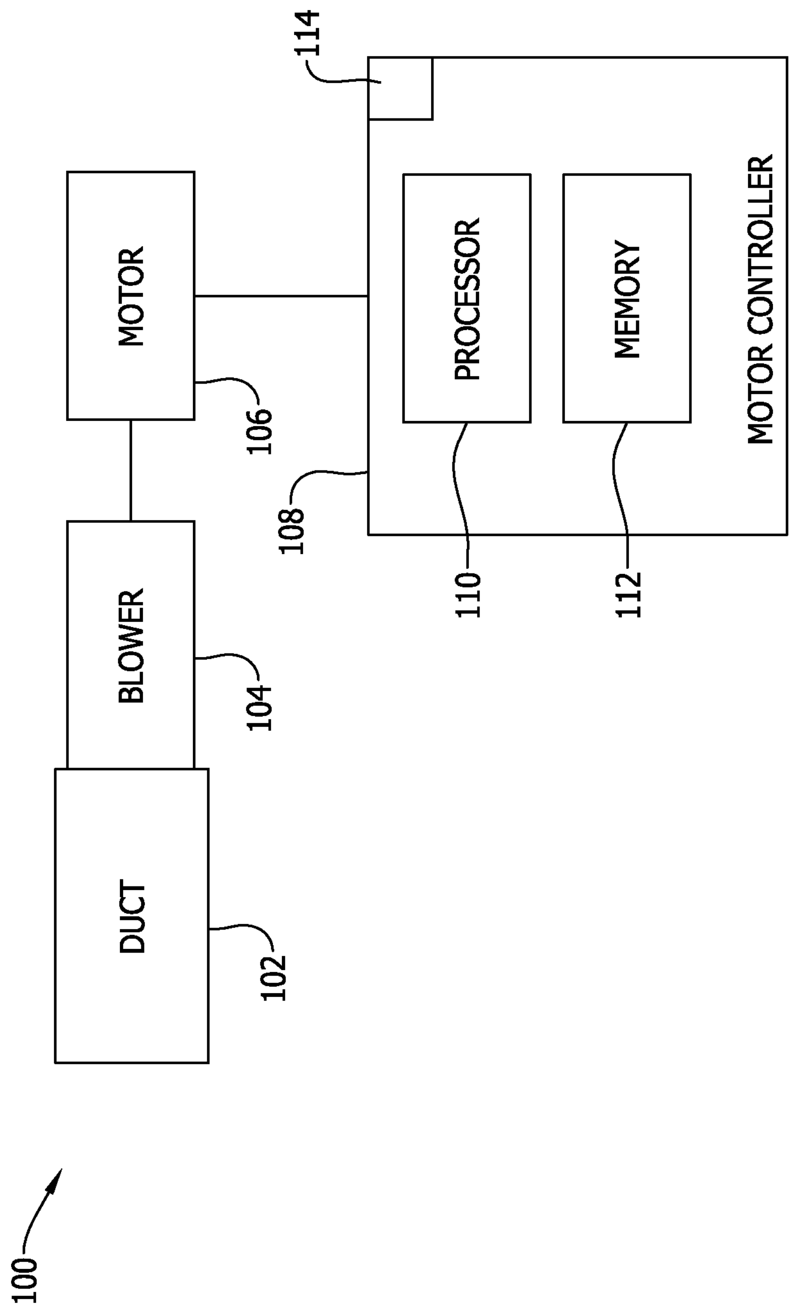
FIG. 1 is a block diagram of an exemplary blower system.

Embodiments of the motor controller and methods of operating an electric motor described herein provide improved calibration of the electric motor based on motor speed and airflow, particularly for low airflow output levels.

At least some known motor controllers are configured to calibrate motors in blower systems to define a speed-torque-airflow relationship between the motor and the blower such that adjusting a torque output or a speed output of the motor facilitates control of the blower's airflow output in a predictable manner to produce a constant airflow. Known motor controllers are configured to calibrate the motors using a plurality of calibration points (i.e., speed-torque-airflow measurements) to map the speed-torque-airflow relationship. Although higher airflow output levels, where errors in torque output are minimized (e.g., 40% to 80% maximum torque output, inclusively, of the motor) may be calibrated using a relatively small number of calibration points, because the airflow sensitivity to torque variations is substantially lower at higher airflows, lower airflow output levels may require using a relatively large number of calibration points. Collecting a plurality of calibration points is time-consuming and may be susceptible to error due to various sources of error associated with torque. However, at low airflow output levels, errors associated with torque (e.g., parasitic current, etc.) may cause errors in controlling and maintaining a requested airflow.

Motor controllers described herein are configured to further calibrate a motor coupled to a blower for an airflow restriction based on a motor speed and an airflow at a single calibration point. Such a calibration is also referred to as characterizing the airflow restriction. At least some motor controllers calibrate the motor based on two or more calibration points. The motor is coupled to a blower in a blower system to move, or circulate, air, or otherwise generate an airflow. It is realized herein that changes in airflow are generally directly proportional to changes in blower speed, given that other system properties, such as airflow restriction, remain constant. Consequently, at least a portion of the motor speed-airflow relationship is substantially linear. Motor speed of the motor and airflow of the blower have a non-linear relationship for a given airflow restriction of the blower at low airflow output levels. As used herein, an airflow restriction is a set of parameters (e.g., duct size, duct geometry, etc.) that defines the airflow output of the blower with respect to pressure. The motor controller is configured to receive a command to operate at a calibrating airflow. The calibrating airflow is achieved with a calibrating torque output of the motor. If the calibrating torque is within a predefined calibrating region where torque output errors are at a minimum (e.g., approximately between 40% and 80% maximum torque output, inclusively), a calibration process is initiated. A calibration speed associated with the calibrating airflow is written in a memory of the motor controller with the calibrating airflow as a speed-to-airflow ratio. During subsequent airflow requests, particularly for airflow requests requesting an objective airflow significantly less than the calibrating airflow, the speed-to-airflow ratio is used with the objective airflow to compute an objective speed. In some embodiments, the objective speed is computed by linearly extrapolating the ratio for the objective airflow. The motor controller operates the motor in a speed-control mode at the objective speed to drive the blower to generate an output airflow that approximates the objective airflow. Alternatively, the motor controller operates the motor in a torque-control mode to achieve the objective speed. The output airflow is determined using a single calibration point and the computational error with respect to the objective airflow, in certain embodiments, may be within acceptable ranges (e.g., 5% error). In some embodiments, a correction function may be applied when computing the objective speed to reduce the computational error. Unlike known motor control techniques that estimate airflow output based on predetermined speed-torque-airflow relationships, characterizing an airflow restriction, or duct, as a speed-airflow relationship limits the effect of the errors associated with torque output.

FIG. 1 is block diagram of an exemplary blower system 100. System 100 includes a duct 102, a blower 104, a motor 106, and a motor controller 108. In other embodiments, system 100 may include additional, fewer, or alternative components, including those described elsewhere herein.

Blower 104 is configured to generate an airflow directed through duct 102. In at least some embodiments, blower 104 is a forward-curved centrifugal blower. In other embodiments, blower 104 is a different type of blower. Duct 102 is configured to guide the airflow for circulation and distribution within a building, vehicle, or other structure. Duct 102 has an airflow restriction that affects the airflow output from blower 104. The airflow restriction is based on various parameters that may affect airflow within system 100, such as, but not limited to, the internal dimensions of duct 102, open or closed dampers, contaminants (e.g., dust) within duct 102, the geometry of duct 102, and the like.

Motor 106 is configured to drive blower 104 to generate the airflow into duct 102. In at least some embodiments, motor 106 is an electric motor configured to convert electrical power into mechanical power. In one example, motor 106 is coupled to a wheel (not shown) of blower 104 and is configured to rotate the wheel. In the exemplary embodiment, motor 106 is configured to operate at a plurality of torque output levels to increase or decrease a corresponding motor speed. Increasing or decreasing the motor speed of motor 106 causes motor 106 to drive blower 104 to generate corresponding airflows. The airflow generated by blower 104 is at least partially a function of the motor speed of motor 106 and the airflow restriction of duct 102. In some embodiments, motor 106 is integrated with blower 104.

Motor controller 108 is communicatively coupled to motor 106 to operate motor 106. More specifically, motor controller 108 transmits control signals to motor 106 to operate motor 106. By adjusting the control signals, motor controller 108 is configured to control the torque of motor 106, thereby facilitating control of the speed of motor 106. In other embodiments, motor controller 108 may be communicatively coupled to another controller (not shown) associated with motor 106. In such embodiments, motor controller 108 may be configured to cause the other motor controller to operate motor 106. In the exemplary embodiment, motor controller 108 is separate from motor 106. In one example, motor controller 108 is within a unit (not shown) that may include blower 104 and/or motor 106 for installation within duct 102. In another example, motor controller 108 is an external controller, such as a thermostat system or a system controller coupled to blower system 100. Alternatively, motor controller 108 may be integrated with motor 106.

In the exemplary embodiment, motor controller 108 includes a processor 110, a memory 112 communicatively coupled to processor 110, and a sensor system 114. Processor 110 is configured to execute instructions stored within memory 112 to cause motor controller 108 to function as described herein. Moreover, memory 112 is configured to store data to facilitate calibrating motor 106. In some embodiments, motor controller 108 may include a plurality of processors 110 and/or memories 112. In other embodiments, memory 112 may be integrated with processor 110. In one example, memory 112 includes a plurality of data storage devices to store instructions and data as described herein. Sensor system 114 includes one or more sensors that are configured to monitor motor 106. In the exemplary embodiment, sensor system 114 is configured to monitor a current output of controller 108 to motor 106. Sensor system 114 may monitor other data associated with motor 106, such as, but not limited to, motor speed, torque, power, and the like. In certain embodiments, sensor system 114 is configured to monitor an airflow output of blower 104. For example, sensor system 114 may include an air pressure sensor configured to monitor air pressure within duct 102. In some embodiments, sensor system 114 monitors motor 106 from motor controller 108. In such embodiments, sensor system 114 may be integrated with processor 110. In other embodiments, at least some sensors of sensor system 114 may be installed on motor 106 and transmit sensor data back to motor controller 108.

In the exemplary embodiment, motor controller 108 is configured to calibrate motor 106 for a plurality of airflow output levels as described herein. Each airflow output level is associated with a particular airflow to be generated by blower 104. In one example, motor controller 108 is configured to calibrate motor 106 for three or four (e.g., low, medium, high, and auto) airflows that a user of system 100 may select or that are automatically selected by another controller.

Figure 2:
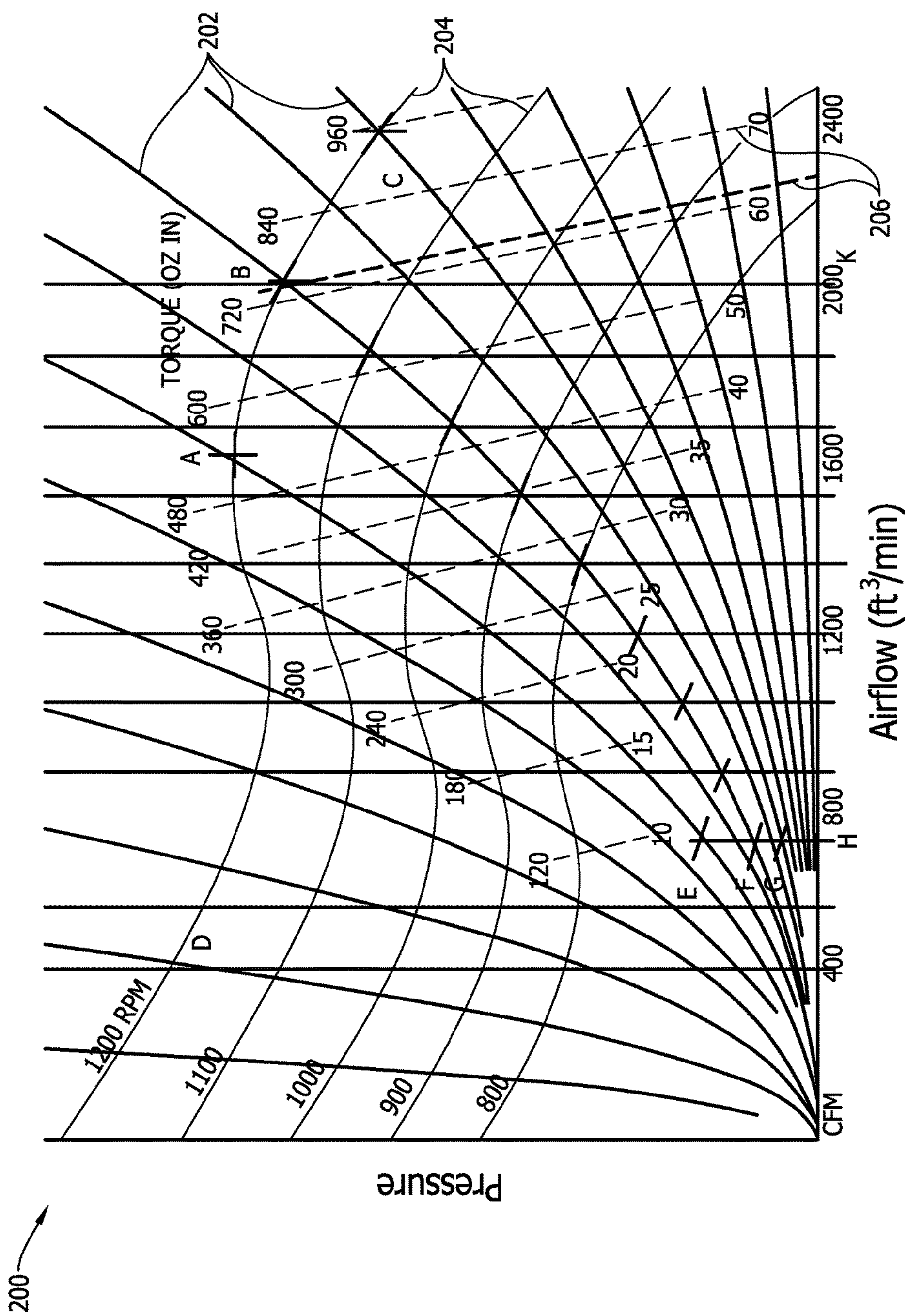
FIG. 2 is a graph of exemplary airflow output for the blower system shown in FIG. 1.

FIG. 2 is a graph 200 of exemplary airflow output for blower system 100 (shown in FIG. 1). Graph 200 depicts an exemplary relationship between airflow in cubic-feet-per-minute (CFM) and air pressure in inches of water column for a plurality of airflow restrictions. With respect to FIGS. 1 and 2, graph 200 includes a plurality of lines 202 representing airflow at different airflow restrictions of duct 102. Graph 200 further includes a plurality of lines 204 and a plurality of lines 206. Lines 204 represent discrete constant motor speeds (rotations per minute (RPM)) of motor 106 and lines 206 represent constant torque (ounce-inch) of motor 106.

In the exemplary embodiment, the intersection of lines 204 with each line 202 indicates an airflow that corresponds to the airflow restriction associated with line 202 and the constant motor speed associated with each line 204. Similarly, the intersection of lines 206 indicates an airflow that corresponds to the airflow restriction associated with line 202 and the constant torque associated with each line 206.

In the exemplary embodiment, as described herein, a calibration process is performed at least partially by motor controller 108 to calibrate motor 106 (both shown in FIG. 1) when the motor torque is within a predefined calibration region. In at least some embodiments, motor controller 108 is configured to initiate the calibration process in response to a command requesting calibration of motor 106. In other embodiments, motor controller 108 may be configured to determine whether motor 106 is calibrated and automatically begins the calibration process when motor controller 108 determines motor 106 is out of calibration.

During the calibration process, a calibrating speed and a calibrating airflow are determined to compute a speed-to-airflow ratio for a specific airflow restriction. The speed-to-airflow ratio is used to compute an objective speed for an objective airflow. In one example, calibrating points A, B, and C are used to determine objective speeds E, F, and G for an objective airflow H. In particular, for the calibrating point B, a calibrating speed D is determined at a calibrating airflow K. A speed-to-airflow ratio is determined based on the calibrating speed D and the calibrating airflow K. The objective speed F is then computed using the ratio and the objective airflow H.

Figure 3:
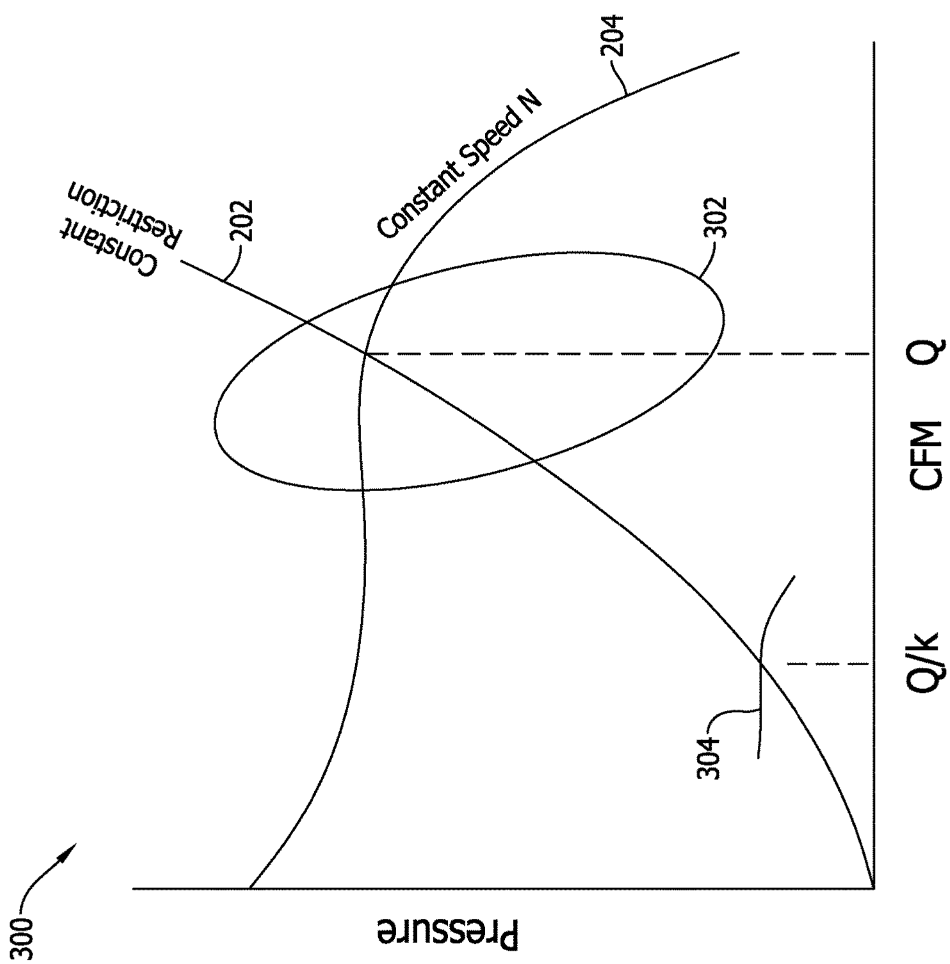
FIG. 3 is a graph of exemplary airflow output for the blower system shown in FIG. 1 for a constant airflow restriction.

FIG. 3 is a graph 300 of exemplary airflow output for blower system 100 (shown in FIG. 1) for a constant airflow restriction. That is, graph 300 includes a single line 202 from graph 200 (shown in FIG. 2) to depict a calibration process of system 100. Similar to graph 200, graph 300 depicts an exemplary relationship between the airflow output and the air pressure for the constant airflow restriction.

With respect to FIGS. 2 and 3, in the exemplary embodiment, motor controller 108 (shown in FIG. 1) is configured to monitor torque to determine whether to initiate a calibration process. More specifically, motor controller 108 is configured to define a calibration region 302 along line 202. Calibration region 302 is associated with torque outputs at which the effect of torque-based errors on the output of system 100 is at a minimum. In one example, calibration region 302 is defined as 40% to 80% maximum torque output, inclusively. In other embodiments, calibration region 302 may include a different range of torque outputs.

In the exemplary embodiment, motor controller 108 is configured to receive a command for a calibrating airflow. Motor controller 108 adjusts a torque output of motor 106 to operate in a constant airflow mode at the calibrating airflow. In the constant airflow mode, the airflow of blower 104 (shown in FIG. 1) and/or other parameters of system 100 (e.g., motor speed or torque) are substantially constant. In the exemplary embodiment, the constant airflow mode for the calibrating airflow is included in a predefined set of output levels (e.g., "low", "medium", "high", etc.) that a user may select to operate motor 106 at different airflows. When operating in the constant airflow mode for the calibrating airflow, motor controller 108 is configured to confirm a calibrating torque at which the calibrating airflow is achieved is within calibrating region 302 to prevent errors associated with torque from substantially affecting the calibration process.

When the calibrating torque is confirmed to be within calibrating region 302, motor controller 108 is configured to determine a calibrating speed associated with the calibrating airflow. In graph 300, the calibrating airflow and the calibrating speed are represented by the intersection of lines 202 and 204. In the exemplary embodiment, a calibrating airflow Q and a calibrating speed N are determined. The calibrating speed N is a motor speed associated with the constant airflow mode. Motor controller 108 may be configured to stabilize the calibrating speed N before determined the speed N. In other embodiments, the calibrating speed N is an average of the motor speeds measured over time during the constant airflow mode. In at least some embodiments, motor controller 108 is configured to write or store the calibrating speed N and the calibrating airflow Q to memory 112 (shown in FIG. 1) for subsequent airflow adjustments. In particular, the calibrating speed N and the calibrating airflow Q are written to memory 112 as a speed-to-airflow ratio (i.e., N/Q) associated with the constant airflow restriction.

When motor controller 108 receives a command for an objective airflow other than the calibrating airflow Q, motor controller 108 is configured to read the speed-to-airflow ratio from memory 112. An objective speed associated with the objective airflow is computed based on the ratio and the objective airflow. Motor controller 108 is configured to operate motor 106 in a torque-control mode or a speed-control mode at the computed objective speed to generate an output airflow equal to or approximately the objective airflow. The speed-control mode is an operating mode of motor 106 where speed is measured against the objective speed and the control loop minimizes speed error. Likewise, in torque-control mode, motor 106 is operated at torque output computed to produce the objective speed, and such that torque is determined (e.g., measuring motor current and calculating a corresponding torque) and the control loop minimizes torque error.

In the exemplary embodiment, motor controller 108 is configured to linearly extrapolate the speed-to-airflow ratio for the objective airflow to compute the objective speed. The linear extrapolation approximates the objective speed associated with the objective airflow using only a single calibrating point while limiting the computational error within acceptable ranges (e.g., 5% error). In one example, Equation 1 may be used to compute the objective speed based on the speed-to-airflow ratio and the objective airflow. Equation 1, below, further includes an exponential correction factor to correct computation errors from the linear extrapolation. In other embodiments, additional or alternative correction functions may be applied to the ratio and the objective airflow to calculate the objective speed. In certain embodiments, the correction functions may only be applied when the objective airflow is below a predetermined threshold value. The predetermined threshold value may represent, for example, a division between the less linear and more linear portions of line 202.

$$\text{Objective Speed} = \text{Calibrating Speed} * \left(\frac{\text{Objective Airflow}}{\text{Calibrating Airflow}}\right)\hat{}\,\text{Correction Factor} \quad (1)$$

In one example, an objective airflow Q/k is requested. The objective airflow Q/k is less than the calibrating airflow Q.

Linear extrapolation of the speed-to-airflow ratio is computed using Equation 1 to determine an objective speed 304. Motor controller 106 is configured to operating motor 106 in, for example, a speed-control mode associated with objective speed 304 to generate an output airflow the same as or similar to the objective airflow Q/k. In at least some embodiments, objective speed 304 is written to memory 112 to facilitate subsequent requests to operate at the objective airflow Q/k.

In the exemplary embodiment, the calibration process is repeated for at least some airflow restrictions. Some airflow restrictions may be substantially similar to each other such that the speed-to-airflow ratio of a similar airflow restriction may be used to compute an objective speed. Different airflow restrictions may be calibrated separately to store the corresponding ratios within memory 112. In at least some embodiments, motor controller 108 may be configured to monitor airflow, motor speed, and/or torque of motor 106, particularly at the calibrating airflow, to determine whether or not the airflow restriction has changed, thereby causing motor 106 to become uncalibrated. If motor 106 is uncalibrated, motor controller 108 may be configured to automatically initiate the calibration process when a calibrating airflow is requested.

Figure 4:
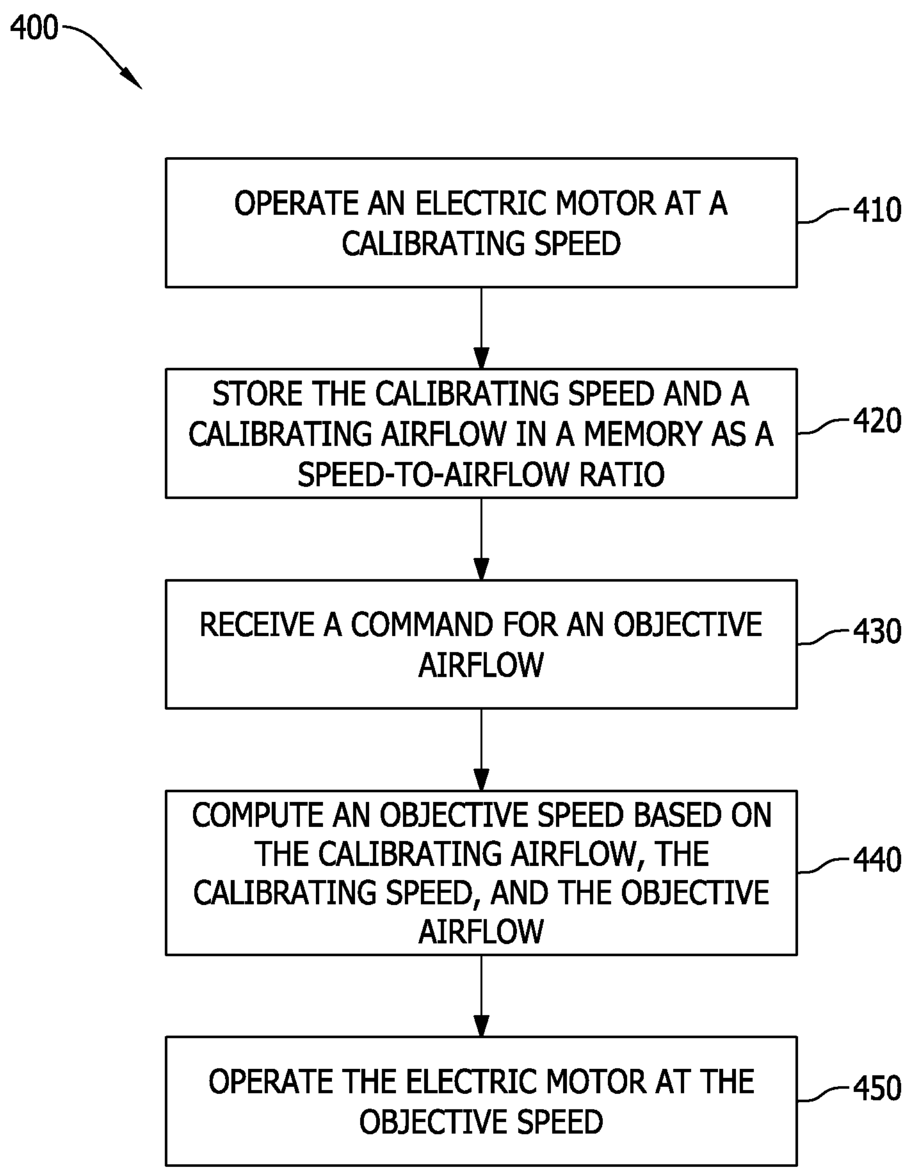
FIG. 4 is a flow diagram of an exemplary method of operating an electric motor embodied in the blower system shown in FIG. 1.

FIG. 4 is a flow diagram of an exemplary method 400 of operating electric motor 106 of blower system 100 (shown in FIG. 1). Method 400 is at least partially performed by motor controller 108 (shown in FIG. 1). In other embodiments, method 400 may include additional, fewer, or alternative steps, including those described elsewhere herein.

With respect to FIGS. 1 and 4, motor controller 108 operates 410 motor 106 at a calibrating speed to drive blower 104 to generate a calibrating airflow. In some embodiments, motor controller 108 determines a calibrating torque at which calibrating airflow is achieved is within a calibrating range. Motor controller 108 stores 420 the calibrating speed and the calibrating airflow in memory 112 as a speed-to-airflow ratio. In certain embodiments, motor controller 108 determines whether or not the ratio has not been previously stored. If the ratio has been previously stored, motor controller 108 may end the calibration process. Subsequently, motor controller 108 receives 430 a command for an objective airflow that is less than the calibrating airflow and computes 440 an objective speed based on the calibrating airflow, the calibrating speed, and the objective airflow. In some embodiments, the objective speed is computed 440 by linearly extrapolating the speed-to-airflow ratio for the objective airflow. In certain embodiments, a correction function (e.g., a correction exponential factor) may be applied to compute the objective speed. Motor controller then operates 450 motor 106 at the computing objective speed to drive blower 104 to generate an output airflow. The output airflow may be equal to or similar to the objective airflow.

Figure 5:
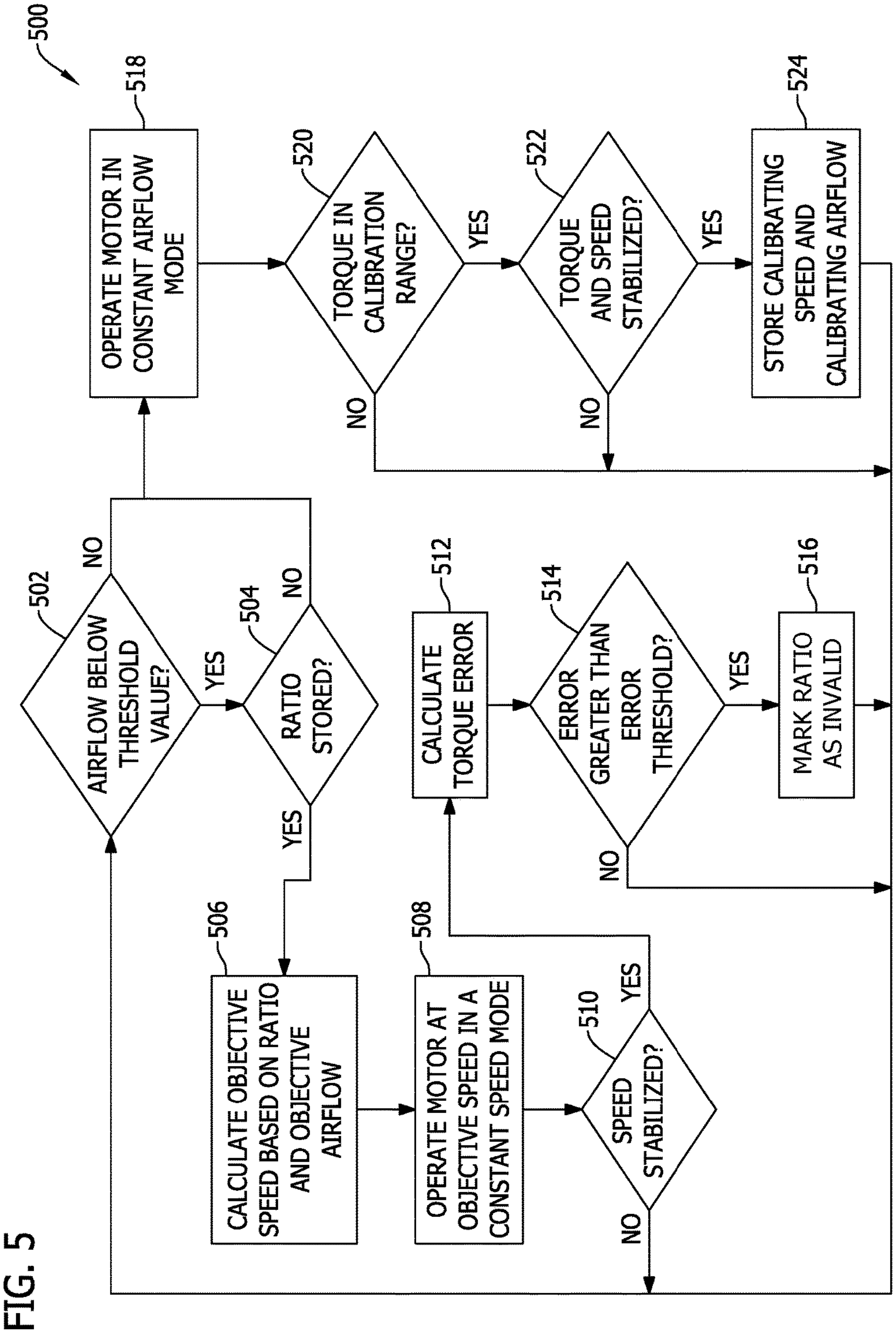
FIG. 5 is a flow diagram of another exemplary method of operating an electric motor embodied in the blower system shown in FIG. 1.

FIG. 5 is a flow diagram of another exemplary method 500 of operating electric motor 106 of blower system 100 (shown in FIG. 1). Method 500 is at least partially performed by motor controller 108 (shown in FIG. 1). Method 500 is a hybrid method of calibrating motor 106 that facilitates operation at low airflow output levels prior to calibration of motor 106. In addition, method 500 facilitates recalibration of motor 106, particularly if the airflow restriction of system 100 has changed.

With respect to FIGS. 1 and 5, motor controller 108 receives a command associated with a requested airflow. Motor controller 108 is configured to determine 502 if the requested airflow is below a predetermined threshold value. The predetermined threshold value may represent, for example, airflows associated with low torque outputs or airflows on the less linear portion of line 202 (shown in FIGS. 2 and 3). The predetermined threshold value may be stored in memory 112 for each airflow restriction. If the requested airflow is below the threshold value, motor controller 108 determines 504 if a valid speed-to-airflow ratio for the current airflow restriction is stored in memory 112. A valid speed-to-airflow ratio is a ratio that applies to the current parameters of system 100, such as the airflow restriction. In some embodiments, memory 112 may store a plurality of ratios for a plurality of airflow restrictions. In such embodiments, at least some ratios may be invalid ratios, or ratios that are not applicable to the current parameters of system 100. If the valid ratio is stored in memory 112, motor controller 108 calculates 506 an objective speed based on the stored ratio and the requested airflow (i.e., the objective airflow). Motor controller 108 operates 508 motor 106 at the objective speed in, for example, a speed-control mode to drive blower 104 to generate an output airflow.

Motor controller 108 then determines 510 if the motor speed is stabilized. If the speed is not stable, motor controller 108 repeats method 500 until the speed is stable to prevent motor controller 108 from incorrectly determining motor 106 is uncalibrated as described herein. If the speed is stable, motor controller 108 calculates 512 a torque error for the objective airflow. More specifically, in parallel to calculating 506 the objective speed, motor controller 108 is configured to compute a model torque based on a torque-airflow relationship. In the exemplary embodiment, the torque-airflow relationship is an approximately exponential relationship such that decreasing airflow requires an exponential decrease in torque. The model torque is computed based on a calibrating torque, calibrating airflow, and the requested airflow. Motor controller 108 is configured to determine an objective torque associated with the speed-control mode for the objective speed. Motor controller 108 compares the model torque and the objective torque to calculate 512 the torque error. Motor controller 108 then determines 514 if the torque error is greater than a predetermined error threshold (e.g., 5-20% error). The predetermined error threshold may be stored by memory 112. If the error is less than the predetermined threshold, motor 106 is operating within acceptable error ranges and continues to operate in the speed-control mode. Having a torque error greater than the threshold may indicate motor 106 needs to be recalibrated (e.g., the airflow restrictions have changed). Motor controller 108 marks 516 the stored ratio as invalid 112 to facilitate determining a new ratio for the airflow restriction. In some embodiments, the ratio may not be removed, but instead an indicator stored with the ratio indicates a new ratio is required.

Returning to determining 502 if the airflow is below the predetermined threshold, if the airflow is above the predetermined threshold, motor controller 108 is configured to operate 518 motor 106 in a constant airflow mode prior to a calibration process. Motor controller 108 is configured to monitor the airflow output of blower 104 and adjust control of motor 106 to maintain a constant airflow. In one embodiment, motor controller 108 is configured to control the motor speed of motor 106 to maintain constant airflow. In another embodiment, motor controller 108 is configured to control the torque output of motor 106 to maintain constant airflow. In such embodiments, motor controller 108 controls the motor speed or torque of motor 106 based on predefined speed-airflow relationships and torque-airflow relationships, respectively. Similarly, if motor controller 108 determines 504 a valid ratio is not stored within memory 112, motor controller 108 operates 518 motor 106 in the constant airflow mode.

In the exemplary embodiment, motor controller 108 is configured to determine 520 if the generated torque output is within the calibration range (e.g., 40% to 80% maximum torque output, inclusively). If the torque output is not within the calibration range, motor controller 108 does not calibrate motor 106. If the torque output is within the calibration range, motor controller determines 522 whether the torque output and motor speed of motor 106 have stabilized. If the torque output and/or the speed are not stabilized after a predefined period of time, motor controller 108 does not calibrate motor 106. If the torque output and the speed stabilize, motor controller 112 stores the speed as the calibrating speed and the requested airflow as the calibrating airflow. In the exemplary embodiment, the calibrating speed and the calibrating airflow are stored in memory 112 as a speed-to-airflow ratio.

The methods and systems described herein may be implemented using computer programming or engineering techniques including computer software, firmware, hardware or any combination or subset thereof, wherein the technical effect may include at least one of: (a) improved motor performance at low airflow output levels; (b) limiting or otherwise preventing the effect of torque error in calibrating the motor; (c) reducing the number of necessary calibration points to one; and (d) reducing the time of calibration, thereby reducing the effect of calibration on operation of the motor.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for an electric motor configured to drive a blower to generate an airflow, said motor controller comprising:

a memory configured to store a single speed-to-airflow ratio associated with an airflow restriction on the blower; and a processor coupled to said memory and configured to:

receive a command for a calibrating airflow;

operate the electric motor in a constant airflow mode to generate the calibrating airflow at a calibrating speed;

write the calibrating speed and the calibrating airflow to said memory as the single speed-to-airflow ratio;

receive a first command for a first objective airflow;

compute a first objective speed based on the single speed-to-airflow ratio and the first objective airflow;

operate the electric motor at the first objective speed to generate a first output airflow;

receive a second command for a second objective airflow;

compute a second objective speed based on the single speed-to-airflow ratio and the second objective airflow; and operate the electric motor at the second objective speed to generate a second output airflow.

2. The motor controller of claim 1, wherein said processor is further configured, in computing the objective speed, to linearly extrapolate the single speed-to-airflow ratio for the objective airflow.

3. The motor controller of claim 2, wherein said processor is further configured, in computing the objective speed, to apply a correction function to the linear extrapolation for the objective airflow.

4. The motor controller of claim 1, wherein said processor is further configured to monitor torque output at the objective speed to detect a change in the airflow restriction on the blower.

5. The motor controller of claim 1, wherein said processor is further configured, before operating the electric motor in a constant airflow mode to generate the calibrating airflow, to determine the single speed-to-airflow ratio has not been stored.

6. The motor controller of claim 1, wherein said processor is further configured to stabilize the calibrating speed before writing the calibrating speed and the calibrating airflow to said memory as the single speed-to-airflow ratio.

7. The motor controller of claim 1, wherein said processor is further configured, before operating the electric motor in a constant airflow mode to generate the calibrating airflow, confirm a calibrating torque, at which the calibrating airflow is achieved, is within a calibrating range defined as 40% to 80% maximum torque output, inclusively.

8. A method of operating an electric motor configured to drive a blower to generate an airflow, said method comprising:

operating the electric motor at a calibrating speed to drive the blower to generate a calibrating airflow;

storing the calibrating speed and the calibrating airflow in a memory as a single speed-to-airflow ratio;

receiving a first command for a first objective airflow that is less than the calibrating airflow;

computing first objective speed based on the single speed-to-airflow ratio and the first objective airflow;

operating the electric motor at the first objective speed to drive the blower to generate a first output airflow;

receiving a second command for a second objective airflow;

computing a second objective speed based on the single speed-to-airflow ratio and the second objective airflow; and operating the electric motor at the second objective speed to generate a second output airflow.

9. The method of claim 8 further comprising, before storing the calibrating speed and the calibrating airflow:

determining a calibrating torque, at which the calibrating airflow is achieved, is within a calibrating range; and determining a valid speed-to-airflow ratio is not stored.

10. The method of claim 9 further comprising:

monitoring a torque output when operating the electric motor at the objective speed;

detecting a change in the torque output when operating the electric motor at the objective speed;

marking the single speed-to-airflow ratio as invalid in response to detecting the change in the torque output; and initiating a recalibration and storing of a single new speed-to-airflow ratio.

11. The method of claim 8, wherein computing the objective speed comprises:

linearly extrapolating the single speed-to-airflow ratio for the objective airflow; and applying a correction function to the linear extrapolation for the objective airflow.

12. The method of claim 11, wherein applying the correction function comprises raising the ratio of the objective airflow to the calibrating airflow, to the power of a correction factor.

13. The method of claim 8, wherein operating the electric motor at the calibrating speed comprises operating the electric motor in a speed-control mode.

14. A blower system, comprising:

a blower configured to generate an airflow;

an electric motor coupled to said blower and configured to drive said blower; and a motor controller coupled to said electric motor and configured to:

receive a command for a calibrating airflow;

determine a calibrating speed at which said electric motor turns to drive said blower to generate a calibrating airflow;

operate the electric motor to drive said blower to generate the calibrating airflow at the calibrating speed; and store the calibrating speed and the calibrating airflow in a memory as a single speed-to-airflow ratio;

compute a first objective speed based on the single speed-to-airflow ratio and a first commanded objective airflow; and operate said electric motor at the first objective speed to generate a first output airflow;

compute a second objective speed based on the single speed-to-airflow ratio and a second commanded objective airflow; and operating the electric motor at the second objective speed to generate a second output airflow.

15. The blower system of claim 14, wherein said motor controller is further configured, in determining the calibrating speed, to:

determine a calibrating torque, at which the calibrating airflow is achieved, is within a calibrating range; and determine a valid speed-to-airflow ratio is not stored.

16. The blower system of claim 14, wherein said motor controller is further configured, in computing the objective speed, to:

linearly extrapolate the single speed-to-airflow ratio for the objective airflow; and apply a correction function to the linear extrapolation for the objective airflow.

17. The blower system of claim 16, wherein said motor controller is further configured, in computing the objective speed, to raise the ratio of the objective airflow to the calibrating airflow, to the power of a correction factor.

18. The blower system of claim 14, wherein said motor controller is further configured to determine a new calibrating speed at which said electric motor turns to drive said blower to generate the calibrating airflow after detecting an airflow restriction of the blower system has changed.

* * * * *